(12) United States Patent
Schoner et al.

(10) Patent No.: US 7,230,651 B2
(45) Date of Patent: Jun. 12, 2007

(54) A/V DECODER HAVING A CLOCKING SCHEME THAT IS INDEPENDENT OF INPUT DATA STREAMS

(75) Inventors: Brian Schoner, Fremont, CA (US); Darren Neuman, San Jose, CA (US); Aleksandr M. Movshovich, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 255 days.

(21) Appl. No.: 10/300,371

(22) Filed: Nov. 20, 2002

(65) Prior Publication Data

US 2004/0075765 A1   Apr. 22, 2004

Related U.S. Application Data

(60) Provisional application No. 60/420,152, filed on Oct. 22, 2002.

(51) Int. Cl.
*H04N 5/04* (2006.01)
*H04N 9/475* (2006.01)
(52) U.S. Cl. ............... 348/500; 348/512; 375/240.28
(58) Field of Classification Search ............ 348/500, 348/512, 506, 192, 543, 544; 375/240.28, 375/240.26, 293, 354, 355; *H04N 5/04, H04N 9/44, 9/475, 9/45*
See application file for complete search history.

(56) References Cited

U.S. PATENT DOCUMENTS

| 5,430,485 | A | * | 7/1995 | Lankford et al. ........ 348/423.1 |
| 5,612,981 | A |   | 3/1997 | Huizer |
| 6,055,021 | A | * | 4/2000 | Twitchell ................... 348/513 |
| 2004/0047593 | A1 | * | 3/2004 | Ota ............................. 386/46 |

FOREIGN PATENT DOCUMENTS

| EP | 1093302 | 4/2001 |
| WO | WO 01/22736 | 3/2001 |

* cited by examiner

*Primary Examiner*—Sherrie Hsia
(74) *Attorney, Agent, or Firm*—McAndrews Held & Malloy Ltd.

(57) ABSTRACT

Devices and methods are disclosed for decoding data in a data stream. One embodiment relates to a method of decoding data using an A/V decoder. In this embodiment, timing information is recovered from the input stream. The output rate of an output stream is adjusted using the recovered timing information, where the output stream has a clock that is asynchronous to a time reference of the input stream.

19 Claims, 8 Drawing Sheets

A/V DECODER HAVING A CLOCKING SCHEME THAT IS INDEPENDENT OF INPUT DATA STREAMS

CROSS-REFERENCE TO RELATED APPLICATIONS

This application is related to, and claims benefit of and priority from, Provisional Application No. 60/420,152 dated Oct. 22, 2002, titled "A/V Decoder Having a Clocking Scheme That is Independent of Input Data Streams", the complete subject matter of which is incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The present invention relates to decoders adapted to process input data streams (alternatively referred to as "input data", "input data streams" or "data streams"). More specifically, the present invention relates to audio/visual decoders (alternatively referred to as "A/V decoders") adapted to process, decode or decompress input data streams that are coded or compressed using a compression format, where the decoder has a clocking scheme that is independent or asynchronous of the clocking scheme of the input data streams.

Currently, a plurality of formats or techniques are used to compress audio-video programs for transmission and storage. See, for example, the compression standards set forth in ISO/IEC IS 13818-1,2,3: Information Technology-Generic Coding of Moving Pictures and Associated Audio Information: Systems, Video and Audio (alternatively referred to as "MPEG-2") including Annex D thereof (alternatively referred to as "Annex D"); ISO/EC IS 11172-1,2,3: Information Technology-Generic Coding of Moving Pictures and Associated Audio for Digital Storage Media at up to about 1.5 Mbits/sec: Systems, Video and Audio (alternatively referred to as "MPEG-1"); Dolby AC-3; Motion JPEG, etc, each of which is incorporated herein by reference in its entirety.

Currently available A/V decoders generally include one or more clock devices. These clock devices ensure that the output of the audio and video samples, data or other information (collectively referred to as "data") is output at the same rate the data is received and input into the A/V decoder. For example, currently available A/V decoders are based on MPEG-2 transport of data. To ensure proper operation of such AV decoders (and any larger A/V system incorporating such A/V decoders) the data output rate of the A/V decoder must match the data input rate of the A/V decoder to prevent overflow or underflow of the A/V decoder buffers. This means that the output video frame rate of the A/V decoder must match its compressed input frame rate and the output audio sample rate of the A/V decoder must match its compressed input audio sample rate.

To accomplish such synchronization in known A/V system—such as MPEG 'Annex D—the receiver clock is locked to the clock of the transmitter, which is called a system time clock (alternatively referred to as an "STC") which may comprise a 27 MHz clock for example. Further, the transmitter transmits or communicates one or more program clock references (alternatively referred to as "PCR") to the receiver. The receiver uses the one or more PCRs to synchronize itself with the transmitter.

Such synchronization in the A/V system may be accomplished using a phase-locked loop (alternatively referred to as a "PLL"). Typically the receivers include a local clock (for example a voltage-controlled oscillator, alternatively referred to as a "VCO"). The receiver compares its local clock to the PCR. If the receiver's local clock is slower than or behind the PCR, the receiver accelerates the local clock. If the receiver's local clock is faster than or ahead of the PCR, the receiver decelerates the local clock. It is contemplated that eventually, the receiver's local clock is synchronized with the STC. Subsequently, the MPEG transport synchronizes the video and audio to the STC. It is further contemplated that most video and audio frames include a presentation time stamp (alternatively referred to as "PTS") and/or a decode time stamp (alternatively referred to as "DTS"). The receiver (the A/V decoder for example) may use such PTS and/or DTS stamps to determine when to decode and display each frame relative to the STC.

It is further contemplated that the local clock (the VCO for example) is used to clock one or more audio/video digital-to-analog converters (alternatively referred to as "DACs") in the A/V decoders. Using the local clock to clock the one or more DACS ultimately determines the video frame rate and audio sample rate at the output of the A/V decoder. Since the local clock is locked to the STC, the output rates of the A/V decoder are thus locked to the transmitter.

However, A/V systems are growing more complex, requiring that A/V decoders integrate more features. A complex A/V decoder may decode several streams simultaneously, requiring several different local clocks. For example one set-top box including a decoder may support two televisions. Each television may display different programs. It is contemplated that each television may be able to support picture-in-picture (alternatively referred to as "PIP"), such that each television may display two different programs simultaneously. In this example, the set-top box may also decode another program to record for future playback. It is contemplated that different local clocks are used to clock all these programs. Furthermore, a complex A/V decoder may require additional synchronous clocks for DRAM and/or internal interfaces (DVI, Ethernet and USB for example).

Typically, existing A/V decoders rely on VCOs for A/V decoding and processing. Advanced A/V decoders with picture-in-picture or PIP or multiple displays may require several VCOs. However, high quality VCOs are expensive. Using a plurality of VCOs in the A/V decoder will affect its production costs and ultimately its retail price. It is contemplated that using multiple clocks (e.g., VCOs) may complicate decoder design. For example, clock balancing, static timing analysis and asynchronous data transfer in the A/V decoder are all affected by multiple clocks. Further, it is known that currently available VCOs may lock to other system clocks (which is sometimes referred to as "injection locking"). Therefore, using multiple VCOs in an A/V decoder may cause such VOC to become locked, ultimately affecting the performance of the A/V decoders.

VCOs are analog components. This means that performance of each VCO may vary depending on the temperature, process and manufacturer. This variance makes designing A/V decoders using such VCOs difficult. Additionally, sharing hardware (video scaler for example) in the A/V decoder is difficult, if such hardware is run at the STC clock rate.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Features of the present invention may be found in an A/V decoder and method of decoding input data streams using a clocking scheme that is independent of the clocking scheme of the input data stream.

One embodiment of the present invention relates to a method of decoding data using an A/V decoder. This method comprises recovering timing information from an input stream and adjusting an output rate of an output stream using the recovered timing information. In this embodiment, the output stream has a clock that is asynchronous to a time reference of the input stream. In one embodiment, adjusting the output rate of the output stream comprises matching the output rate to the timing reference.

Another embodiment relates to a method of decoding data using an A/V decoder. This embodiment comprises receiving an input stream at an input rate and recovering a system time reference (alternatively referred to as "STR") from the input stream. An output rate of an output stream is matched to the timing information, and then the output stream is output having a clock rate asynchronous to the timing information at the output rate.

Another embodiment relates to a method of processing data using an A/V decoder. This method comprises recovering a system time reference from the data and processing the data using a clock asynchronous to the system time reference. The data is then output with a time reference locked to the system timing reference. Other embodiments of the present invention relate to receiving the data prior to recovering the system time reference.

Still another embodiment relates to a method of processing data using an A/V decoder. This method comprises receiving the data and recovering a system time reference from the data using at least one system time reference recovery device. The data is processed in at least one processing device using a clock asynchronous to the system timing reference and output with a time reference locked to the system timing reference.

These and other advantages and novel features of the present invention, as well as details of an illustrated embodiment thereof, will be more fully understood from the following description and drawings.

DETAILED DESCRIPTION OF THE INVENTION

The following description is made with reference to the appended figures.

As A/V decoders increase in complexity, integrating more functionality, the number of clocks in the A/V decoders increase. Increasing the number of clock domains greatly complicates the back-end process of the A/V decoders, including static timing analysis (alternatively referred to as "STA"), layout, scan, clock insertion and balancing, and verification.

It is also contemplated that the large number of clock domains may complicate the front-end design work of the A/V system including A/V decoders. Asynchronous interfaces are awkward to build, and difficult to verify. A/V systems, on one or multiple chips, having multiple A/V decoders may try to route/mix/mux between the different input data streams. These operations are difficult as the input data streams may be in different time bases, and have different timing references One embodiment of the present invention relates to an A/V decoder using digital signal processing rather than the VCOs to control the system timing, where the A/V decoder may be run using a single inexpensive fixed crystal clock. An exemplary embodiment of the present invention comprises four modules: a digital NCO/PLL clock recovery device or system (e.g. an STR recovery device) adapted to recover a timebase; a digital sample rate conversion module or device adapted to control the output rate; a digital PLL adapted to lock the output rates to the recovered timebase; and a dataflow protocol adapted to control the rate of all audio/video processing in the A/V decoder.

Figure 1:
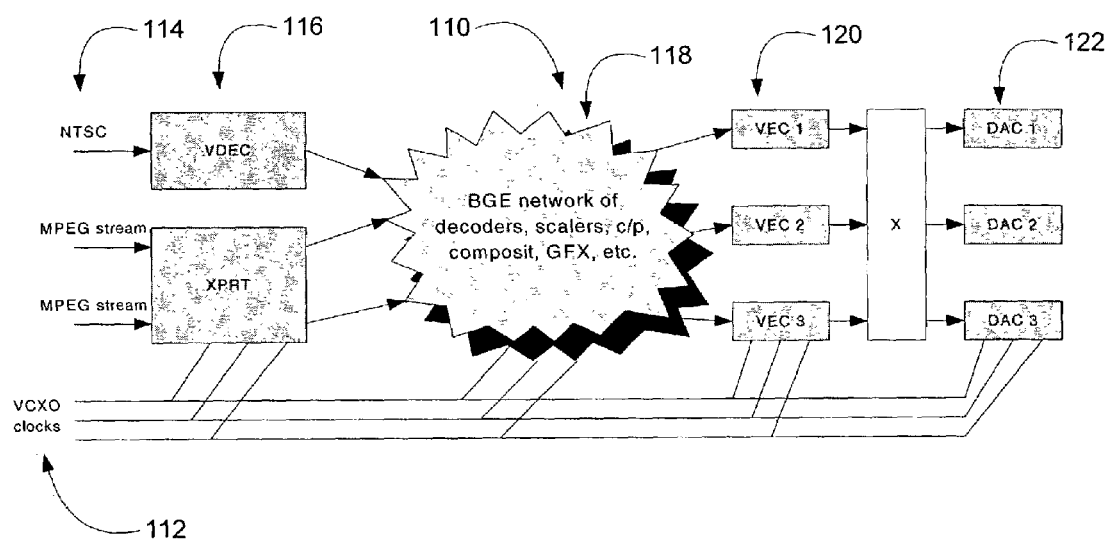
FIG. 1 illustrates a block diagram of one example of a VCXO-based video system.

FIG. 1 illustrates a block diagram of one example of a prior-art VCXO-based video system, generally designated 110. The plurality of VCXO clocks 112 is muxed into every module including the network 118, here comprised of one or more decoders, scalers, video capture & playback (alternatively referred to as "c/p"), composite, graphics (alternatively referred to as "GFX"), etc.

The input data streams 114, here comprising NTSC and one or more MPEG steams for example, use the clocks 112 for program clock reference or PCR recovery. The video decoders (alternatively referred to as "VDEC") and MPEG transport (alternatively referred to as "XPRT"), both generally designated 116, use the clocks 112 for PTS comparison, while the Video encoders (alternatively referred to as "VECs") video digital to analog converters (alternatively referred to as "DACs"), generally designated 120 and 122 respectively, output data at the correct clock rates. It is contemplated that the VECs 120 and DACs 122 require considerable clock or reference muxing to support SCART/composite/component outputs. Such clock or reference muxing complicates the system 110 layout, STA, and scan.

Furthermore, clock or reference muxing may cause glitches on the clocks 112.

One embodiment of the present invention simplifies both the back-end and front-end design of A/V systems, including the design of the A/V decoders. Clocks (PLLs and VCXOs for example) add directly to the cost of the systems. Increasing the number of clocks correspondingly increases the material cost for manufacturing the systems. One embodiment of the present invention reduces the number of asynchronous clock domains and eliminates clock muxes. Reducing the number of clocks, along with eliminating the clock muxes, may reduce the material cost of building the A/V decoders One embodiment of the present invention relates to a method of decoding MPEG video for example using an A/V decoder in accordance with the present invention. In this embodiment, system time references are recovered from input data streams and the output rates are controlled using such recovered system time references. One or more audio/video decoders in the A/V decoder must determine when to decode each frame compliant with MPEG standards. In this embodiment, the audio/video decoders compare a time stamp (e.g., PTS/DTS) with the system time reference. Such PTS/STR comparison is defined in the MPEG standards.

Figure 2A:
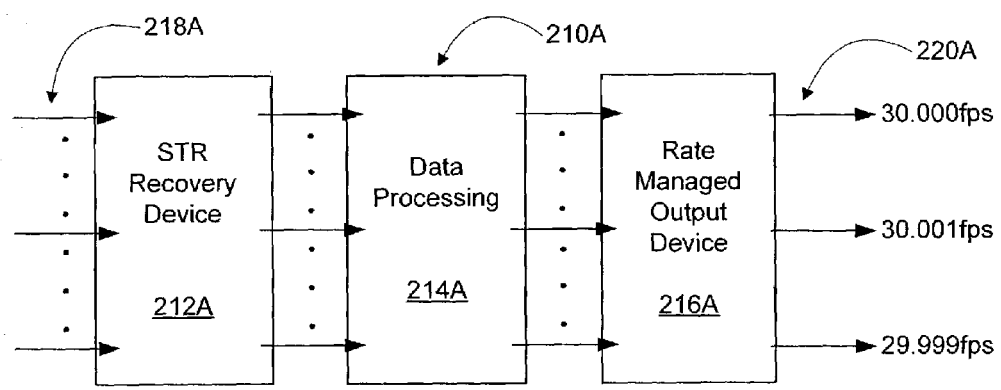
FIGS. 2A and 2B illustrate block diagrams of embodiments of an A/V decoder in accordance with the present invention.
Figure 2B:
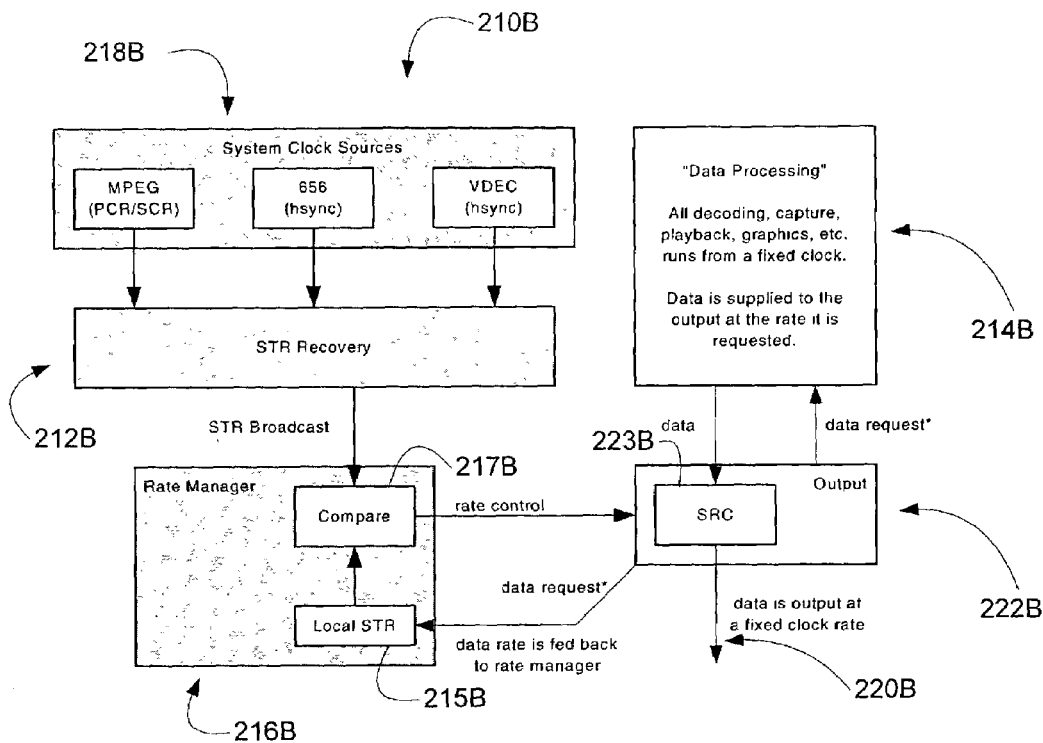

One embodiment of the present invention relates to an A/V decoder device that decodes one or more input data streams with multiple output rates using a single clock reference. This embodiment enables A/V decoders with multiple time bases to be implemented using a single clock reference (alternatively referred to as a "system clock"). It is contemplated that high-speed data conversion devices (i.e., IFDEMOD, QAM and RFMOD devices for example) may be used with one embodiment of an A/V decoder device having such a single clock reference or system clock. FIGS. 2A and 2B illustrate block diagrams of embodiments of an A/V decoder 210 in accordance with the present invention.

In an MPEG scheme currently used in A/V decoders, the system clock is locked to the PCR. For ITU656 video for example, such currently available A/V decoders must output one pixel every 2 clock cycles. The output pixel rate is locked to the system clock, and the system clock is locked to the incoming PCR values. However, in one embodiment of the present invention, the system clock is independent of the PCR values and the output pixel rate. The video SRC (digital sample rate converter) output requests pixels from the A/V decoder. In other words, the A/V decoder supplies pixels at the rate the pixels are requested (i.e., the pixels are "pulled"). Similarly the audio SRC output requests audio samples at a specified rate from the audio decoder. The audio decoder provides samples as requested (i.e., the samples are pulled).

FIG. 2A illustrates a high level block diagram of one embodiment of an A/V decoder, generally designated 210A, in accordance with one embodiment of the present invention. In the illustrated embodiment, the decoder 210A comprises a system time reference recovery device 212A (alternatively referred to as an "STR recovery device") having one or more input data streams 218A. It is contemplated that, in one embodiment, the STR recovery device 212A may comprise a digital PLL (where decoding multiple streams may comprise multiple PLLs) as provided below and in U.S. Provisional Patent Application No. 60/420,136 filed Oct. 22, 2002, titled "NCO Based Timebase Recovery System and Method for A/V Decoder", the complete subject matter of which is incorporated herein by reference in its entirety.

In one example, the STR recovery device comprises an NCO based clock recovery device or system, where the NCO has a predetermined clock rate and increment value. Changing or adjusting the NCO increment value up or down effectively accelerates or decelerates the system time clock or STC as required. It is contemplated that an NCO based clock recovery system and method in accordance with embodiments of the present invention may be used to recover a time base using any clock or time reference in the A/V system. Moreover, it is contemplated that NCOs may be used in a PLL loop similar to analog VCOs. Further, such NCO clock recovery system and method may recover a time base from any input stream (e.g., ITU656, NTSC, MPEG) using one or more asynchronous clocks (i.e., a clock asynchronous to such timebase). More specifically, the NCO may be used to recover the STC in an MPEG A/V system for example. The recovered STC may then be used by the A/V decoder for PTS/DTS comparison.

The STR recovery device 212A is illustrated communicating with an A/V data processing device 214A. In one embodiment of the invention, STR refers to a reference time value, a 43-bit reference time value for example. It is anticipated that different or more complex systems are contemplated. For example if the A/V decoder 210A has more than one data source, the decoder may include more than one STR, where the number of STRs may or may not correspond to the number of data sources.

As an alternative to the MPEG scheme, an A/V system incorporating an A/V decoder in accordance with the present invention may accept analog television signals as inputs. In this embodiment, the analog video input goes through, is processed or decoded by the A/V data processing device 214A, which may comprise a video decoder (alternatively referred to as a "VDEC"). Likewise analog audio goes through, is processed by or decoded by the A/V data processing device 214A which may further comprise a BTSC audio decoder (alternatively referred to as a "ADEC" or "BTSC").

In conventional decoders using VDEC/ADECs, the decoders lock the output rate to the input rate to process the data. Such conventional decoders lock a PLL/VCXO to the analog video line rate, and use this clock to control the video/audio A/D conversion and the output rate. This method requires a separate, unique clock for each analog input.

One embodiment of the present invention uses a system clock (a fixed system clock for example) to control the data processing. It is contemplated that the STR recovery device 212A may be locked to the analog video line rate. The analog hysncs are converted into a psuedo-STR using a simple counter in one embodiment. The STR recovery device 212A locks to this psuedo-STR and broadcasts the recovered STR to the rest of the decoder 210A. The broadcast STR is used to control the output rates as provided previously.

FIG. 2A further illustrates a rate managed output device 216A which is illustrated as communicating with the data processing device 214A. In the illustrated embodiment, the rate managed output device 216A has one or more A/V outputs 220A, which are output at the same or different rates. In FIG. 2A, three A/V outputs, generally designated 220A, are illustrated. For example, one A/V output is output at 29.999 frames per second (alternatively referred to as "fps"), one is output at 30.001 fps and one is output at 30.000 fps. The plurality of outputs in this FIG. 2A illustrate that a plurality of outputs are contemplated, where each of the outputs may be at different rates and/or illustrate that the outputs may vary over time.

More detail about the data processing device 214A and the rate managed output device 216A are disclosed in the U.S. Provisional Patent Application No. 10/300,234 filed Nov. 20, 2002, titled "A/V System and Method Supporting a Pull Data Flow Scheme" and U.S. Provisional Application No. 60/420,344 filed Oct. 22, 2002, titled "Data Rate Management System and Method for A/V Decoder", respectively, the complete subject matter of each of which is incorporated herein by reference in its entirety.

As provided previously, MPEG requires a fixed relationship between the video pixel clock and the audio sample rate. To maintain this relationship, it is necessary to lock the audio sample rate to the video line rate.

The proposed invention uses a VDEC STR broadcast to control an additional SRC of the BTSC output. This SRC is used to lock the audio sample rate to the video line rate. This helps ensure a fixed number of audio samples per video line. In one embodiment, the data processing device 214A bases audio and video processing on multiples of a single, fixed clock, a 27 MHz crystal clock for example. It is contemplated that, as a single fixed clock is used, the processing is not constrained by clock boundaries. Video and audio may be muxed between modules. It is further contemplated that the architecture may be made orthogonal, and easy to control.

In the instant invention, the output sample rate is independent of the system clock rate (i.e., the system clock is fixed, while the output data rate is variable) However, because the sample rate is variable, data processing may not rely on the system clock for timing. As an example, in a traditional MPEG system, a graphics unit may output a pixel every 2 clocks. Since the clock is synchronous with the display, the graphics pixel rate will always match the output display rate.

In the instant invention, only the output sample rate conversion knows the correct output data rate. In one embodiment, the data processing device uses digital protocols (i.e., handshakes) so that the output "pulls" data at the correct rate from each data processing module, even though typical A/V streams (e.g., MPEG) are adapted to operate according to a push mode. The outputs request data as it is needed. Each module in the A/V decoder 210A supplies data to its outputs at the rate it is requested. Because a "pull" model is used, the data processing clock (i.e., the system clock) is not tied to the input data rate. For example, the audio decoder may be clocked at 243 MHz, 133 MHz, or any other reasonable rate. The audio decoder clock does not need to "track" the data rate.

Conventional A/V decoders use a VCXO or VCXO-PLL to lock the chip clock to the input data rate. However, one embodiment of the present invention uses rate managed output devices 216A and the associated SRC devices to change or adjust the video and audio output rates. It is contemplated that, when compared to currently available VCXO-based decoders, A/V decoders including exemplary rate manage output and SRC devices enable: fewer clock domains; fewer VCXOs; fewer PLLs; easier switching of datapaths; easier scaling; and easier CPU control.

It is contemplated that, in one embodiment of the present invention, the output data rate must track the STR. If the A/V decoder decodes multiple video streams, there may be multiple STRs. Each output data rate tracks an associated STR. The process of controlling the output rates is called "rate management." In one embodiment, the rate managed output device 216A (alternatively referred to as a "output rate manager" or "output rate manager PLL"), comprising for example a digital PLL, is used to compare the output rate with the STR, and adjust the output rate accordingly, such that the output data rate matches the STR and the input data rate. In one embodiment the A/V decoder may include several output rate managers, one for each output of the A/V decoder.

It is contemplated that, in accordance with the present invention, the audio and video output rates might be adjusted in several ways. In one embodiment of the present invention, the rate managed output device 216A may use a VCXO-PLL or NCO for example to create a clock. Such clock could be used to clock the audio and video outputs, where the rate managed output device 216A adjusts the VCXO-PLL to change the output rate. Further, another embodiment of the rate managed output device 216A uses a sample rate conversion (alternatively referred to as "SRC") process or method, discussed in greater detail below, to change or adjust the audio and video output rates.

In one embodiment of the present invention, however, sample rate conversion (alternatively referred to as "SRC") is used to fractionally interpolate (or decimate) the existing samples, If the interpolated (decimated) samples are output with the same clock, the effective output rate decreases (increases). That is the clock is constant but the data rate changes, such that the output is indistinguishable from the traditional MPEG "faster clock" method. This invention uses SRC to change the output data rate, while using a fixed output clock rate.

It is contemplated that the output sample rate conversion may be controlled so that the output rates track the STC. In one embodiment, the output rates are controlled with a circuit that is similar to a digital PLL.

FIG. 2B illustrates a block diagram of another embodiment of an A/V decoder, generally designated 210B, in accordance with one embodiment of the present invention. In the illustrated embodiment, the decoder 210B comprises an STR recovery device 212B having one or more input data streams 218B and a STR broadcast output.

In the illustrated embodiment, the input data streams (alternatively referred to as "system clock sources" or "system reference sources") 218B comprise an MPEG (PCR/SCR) stream, a 656 (hysnc) stream and a VDEC (hysnc) stream. While three input streams are illustrated, more complex systems, having more or different input data streams are contemplated. In the illustrated embodiment, the input time references are MPEG PCR/SCR values. However, for analog video or ITU656 video, the hsync timing may be used as the time reference or a fixed timing reference may be used for PVR playback.

The STR recovery device 212B is illustrated as communicating (indirectly in this embodiment) with a data processing device 214B. In one embodiment, the STR recovery device 212B controls the output data rates (along with a rate manager and SRC devices). The data processing device 214B is adapted to decode, capture, play back and produce graphics, etc. from the data inputs (i.e., the input data streams 218B) using a fixed clock or timing reference. That is the data processing devices may decode, capture, play back and produce graphics, etc. using a fixed clock (i.e., the system clock for example). In one embodiment, the data is supplied to an output device or buffer 222B as requested (i.e., the output device requests data from the data processing device or the data is "pulled").

A rate managed output device 216B is illustrated as communicating (indirectly in this embodiment) with at least the data processing device 214B. More specifically, the rate managed output device 216B communicates with the STR recovery device 212B and the output device 222B. In the illustrated embodiment, the rate managed output device 216B comprises at least local-STR and compare devices 215B and 217B respectively, while the output device 222B comprises at least an SRC device 223B.

In one embodiment, the output device 222B outputs data 220B at a fixed clock rate (i.e., the system clock rate) as it is requested. The output device 222B submits data requests to the data processing device 214B, and thus pulls the data. The data request is also submitted or mirrored to the rate managed output device 216B, where it is compared with the STR broadcast in the compare device 217B. A rate control signal is communicated to the output device 222B (specifically the SRC device 223B), ensuring that the data 220B is output at the fixed clock rate, and the output data rate matches the input data rate. The digital sample rate converter converts data from an input sample rate to an output sample rate. In one embodiment, the output sample rate may differ from the input sample rate. By adjusting the SRC parameters, the rate managed output device 216B changes the rate of the sample rate at the input of the SRC device 223B. This change to the sample rate changes the rate the data is requested from the data processing device 214B.

Figure 3:
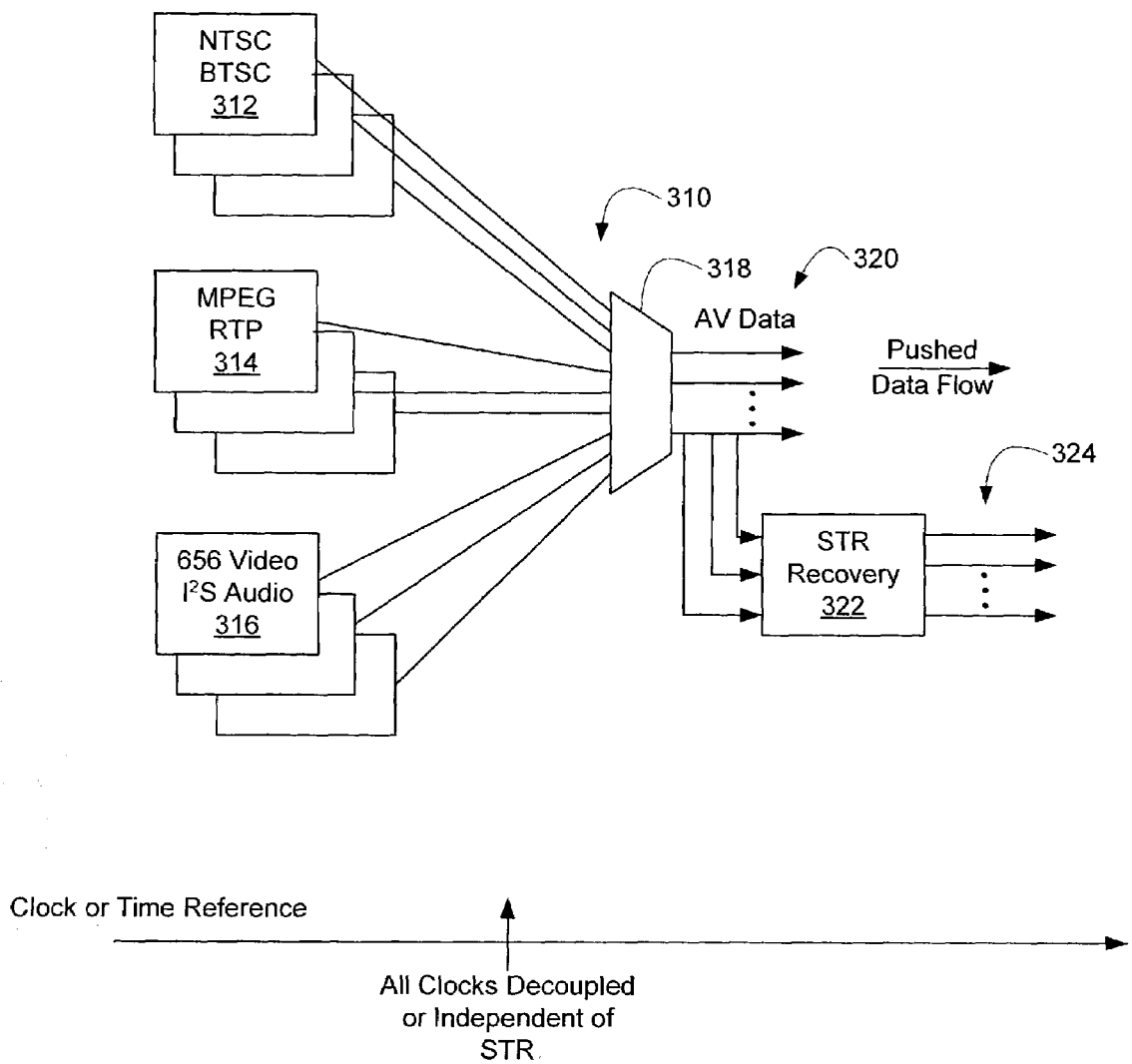
FIG. 3 illustrates a block diagram of an embodiment of the input data streams and the STR recovery device similar to that of FIGS. 2A and 2B in accordance with the present invention.

FIG. 3 illustrates a block diagram of an embodiment of the data input streams and the STR recovery device similar to that of FIGS. 2A and 2B in accordance with the present invention. A plurality of video and audio input data streams 310 are illustrated, for example NTSC and BTSC streams, generally designated 312, MPEG and RTP streams, generally designated 314, and 656 and I$^2$S streams, generally designated 316, are all illustrated as inputs to mux 318. While only one mux 318 is illustrated, two or more muxes are contemplated. Furthermore, while these input schemes are illustrated, other input streams, or different combinations thereof, are contemplated.

The mux 318 outputs a plurality of muxed A/V data in a pushed manner, generally designated 320. It is contemplated that all the clocks associated with the input streams are decoupled or independent of the STR. The STR recovery device 322 outputs one or more system timing references 324 that are recovered from the AV data.

Conventional decoders output data with VDACs/ADACs locked to the input rate as provided previously. For example, such decoders may lock a PLL/VCXO to the analog video line rate, and use this clock to control the video/audio A/D conversion. This method requires a separate, unique clock for each analog video input.

One embodiment of the present invention uses a system clock or system clock reference (a fixed system clock for example) to control the video/audio processing in the data processing device. The STR recovery device 322 is used to lock to the analog video line rate. The analog hysncs are converted into a psuedo-STR using a simple counter in one embodiment. The STR recovery device 322 locks to this psuedo-STR and broadcasts the recovered STR to the rest of the decoder. The broadcast STR is used to control (i.e., adjust or match) the output rates as provided previously.

Figure 4:
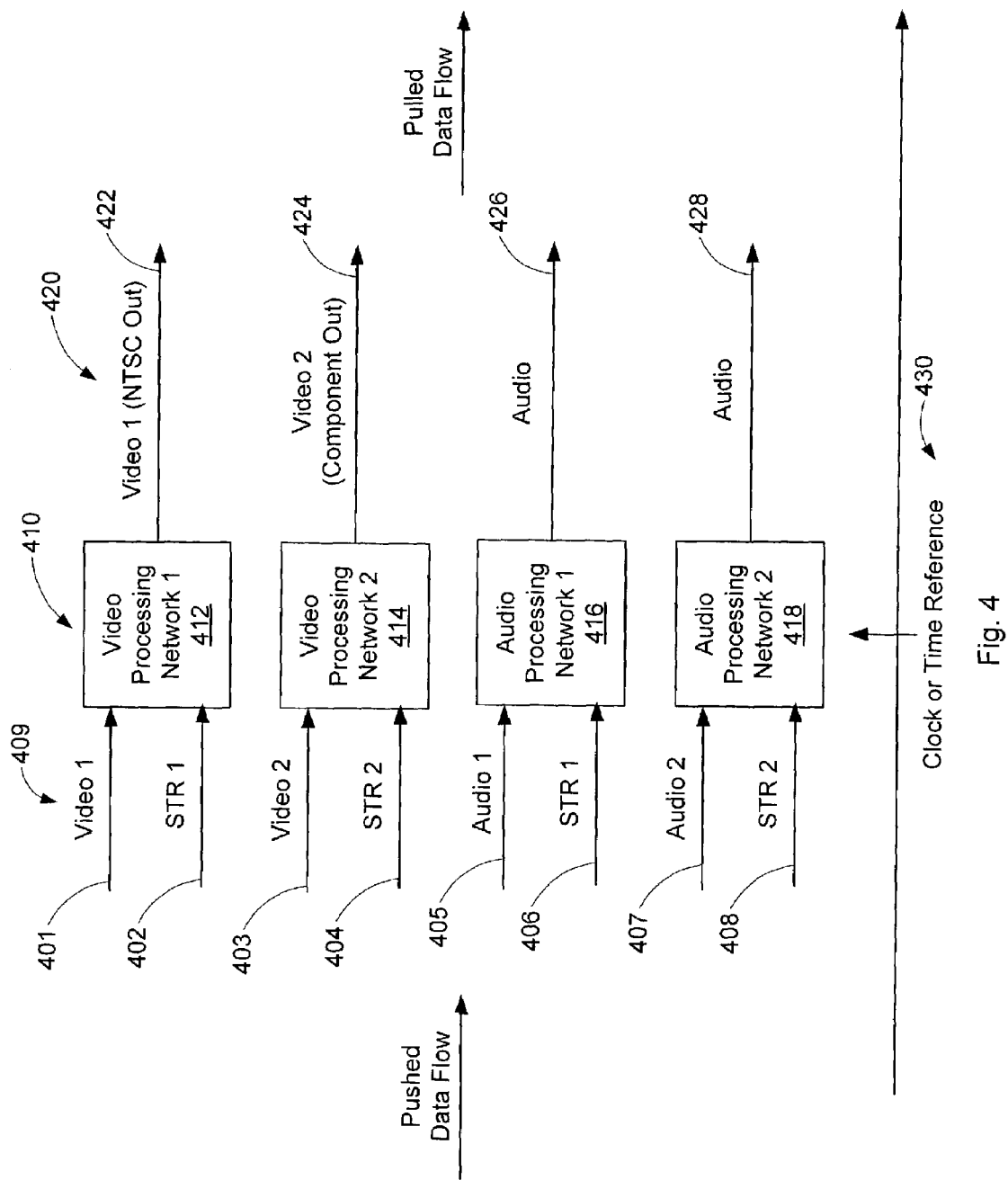
FIG. 4 illustrates a block diagram of an embodiment of the data processing device similar to that illustrated in FIGS. 2A and 2B, processing video data in accordance with the present invention.

FIG. 4 illustrates a block diagram of one embodiment of the data processing device, generally designated 410, similar to that illustrated in FIGS. 2A and 2B. In this embodiment, the processing device 410 is adapted to process audio and video data (at a fixed clock rate that is asynchronous to the time reference of the input stream) in accordance with one embodiment of the present invention using pushed data flow input streams, generally designated 409. In the illustrated embodiment, the decoder 410 comprises a plurality of video and audio processing networks. In FIG. 4 two video processing networks designated 412 and 414 respectively, and two audio processing networks designated 416 and 418 respectively, are illustrated. It should be appreciated that while only two video and audio processing networks are illustrated, more than two video and audio processing networks or different process networks are contemplated.

In this embodiment, each of the processing networks of the data processing device 410 receives one or more inputs, generally designated 409, in a pushed manner and provides an output, generally designated 420 in a pulled manner, where the output is provided as requested. As illustrated, video processing network 412 receives a video stream and STR as inputs, designated 401 and 402 respectively, and provides one video output designated 422, NSTR out for example, in a pulled manner at a fixed clock rate. Likewise, video processing network 414 receives a video stream and STR as inputs, designated 403 and 404 respectively, and provides one video output designated 424, component out for example, in a pulled manner at a fixed clock rate. In one embodiment, the video decoders compare a time stamp (PTS/DTS) with the STR to determine when to decode each frame and provide an output at a fixed clock rate.

Further, FIG. 4 illustrates two audio processing networks, Audio 1 and 2, 416 and 418 respectively. As illustrated, audio processing network 416 receives an audio stream and STR as inputs, designated 405 and 406 respectively, and provides one audio output designated 426 in a pulled manner at a fixed clock rate. Further, audio processing network 418 receives an audio stream and STR as inputs, designated 407 and 408 respectively, and provides one audio output designated 428 in a pulled manner at a fixed clock rate. In one embodiment, the audio decoder compares a time stamp (PTS/DTS) with the STR to determine when to decode each frame.

In the illustrated embodiment, the entire video path is clocked from a single clock 430 (i.e. the fixed clock rate which may be a 135 MHz clock for example). The A/V decoder utilizes STR recovery, STC devices and rate managed output devices to match the video outputs to the input data rates as provided previously. The transport module includes STR recovery and maintains the STRs (STRs 402, 404, 406 and 408 are illustrated) for each input source (streams 401, 403, 405 and 407 are illustrated). In one embodiment, these STRs are broadcast or transmitted to the one or more rate managed output devices.

In one embodiment of the present invention, it is contemplated that data processing device 410 may output several different formats of audio and video. For example, video may be output as analog (composite and/or components), digital ITU 656 and/or digital DVI. Audio may be output as analog, digital SPDIF, and/or digital I$^2$S. The response time of the rate managed output devices keeps all the video and audio outputs tightly synchronized.

As provided previously, the A/V decoder of the present invention uses "pull" data flow. That is, data is pulled out of the data processing device as requested. In one embodiment the video output path uses a video bus. Using a single 27 MHz crystal reference tends to reduce the number of clock domains.

Figure 5:
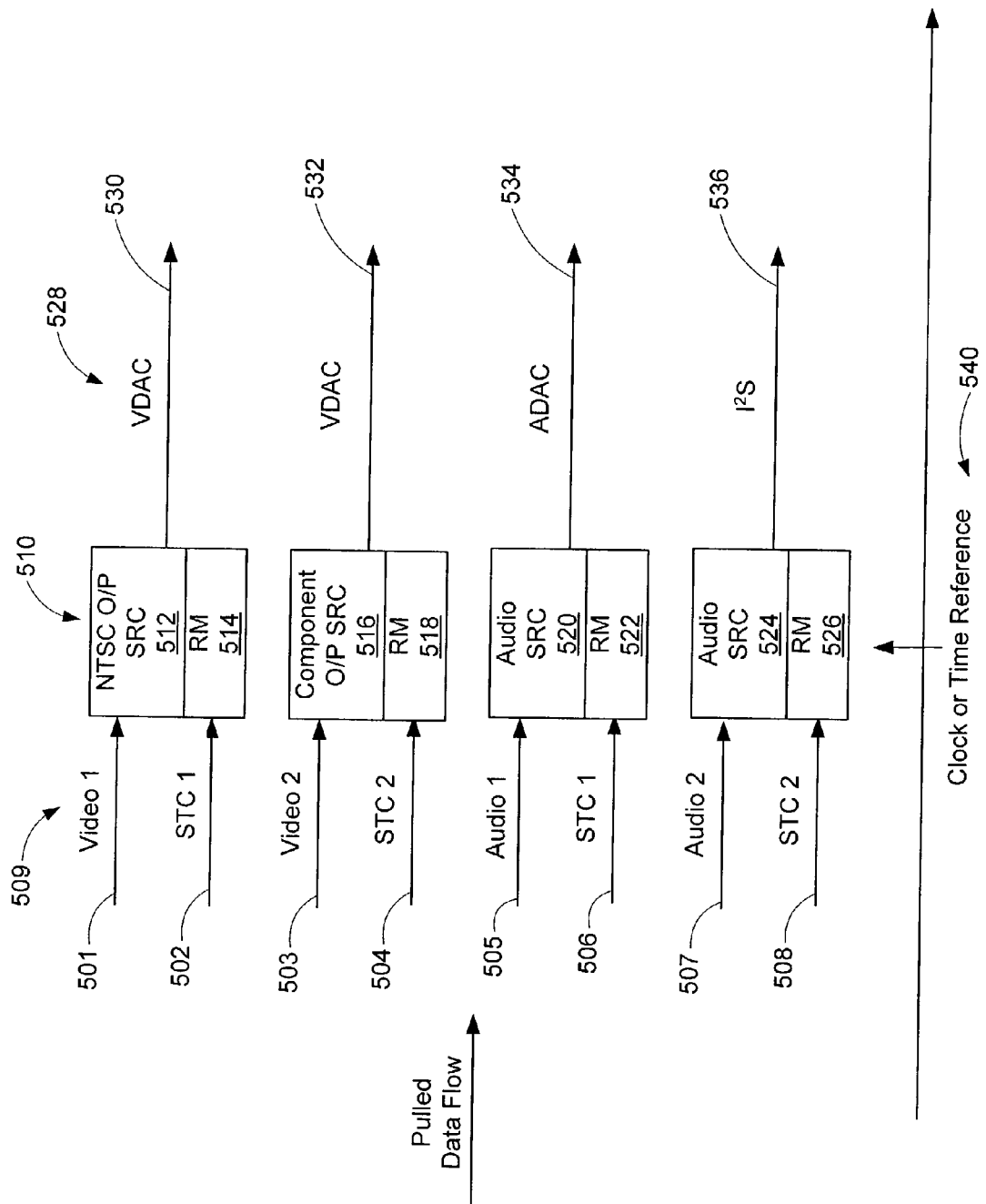
FIG. 5 illustrates a block diagram of an embodiment of the rate managed output device similar to that illustrated in FIGS. 2A and 2B, in accordance with the present invention.

FIG. 5 illustrates a block diagram one embodiment of the rate managed output device 510 similar to that illustrated in FIGS. 2A and 2B using pulled data in accordance with the present invention. This device 510 includes an NSTR 0/P SRC device 512 with an attached or associated rate management output device 514 (alternatively referred to as an "RM device"), a component O/P SRC device 516 with an associated RM device 518, an audio SRC device 520 with an associated RM device 522, and an audio SRC device 524 and associated RM device 526. In one embodiment of the present invention, the one or more SRC devices adjust the output data rates to track the system time references.

In this embodiment, each of the illustrated modules of the data processing device 510, receives one or more inputs, generally designated 509, in a pulled manner and provides an output, generally designated 528. The NTSC/OP SRC 512 has one video input 501 and the attached RM has a STR input 502. The output is VDAC 530. Component O/P SRC 516 has a video input 503 while its attached RM 518 has a STR input 504 and the output is VDAC 532. The audio SRC 520 has an audio input 505 while its attached RM 522 has a STR input 506 and the output is ADAC 534, while the audio SRC 524 has an audio input 507 and its attached RM 526 has a STR input 508 and the output is I$^2$S 536 all of the above modules are clocked from a single clock or time reference 540.

One embodiment of the present invention uses a loop that locks the output sample rate to the system time reference in accordance with the present invention comprising a dual PLL structure. In this embodiment, the dual PLL comprises a digital PLL recovers the STR from the input timing references once a digital PLL is used to lock the output sample rates to the recovered STR. In this embodiment, the STR recovery PLL removes timing jitter and detects discontinuities, while the output rate manager PLL locks the output rate to the STR.

In one embodiment of the present invention, sample rate conversion is used to convert A/V samples from the stream clock rate to the system clock. Note that the STRs and the system clock may be different. It is contemplated that, due to age or the surrounding conditions for example, the clocks may drift slowly over time. The clocks are independent and are not locked. The SRC recovery loop adjusts for any differences between the SRT and the system clock, maintaining the input and output data rates.

The SRC recovery PLL comprising a digital PLL that locks the sample request rate to the STR. In this case, the sample rate is related to the STR by 27/74.25=4/11. The SRC recovery device maintains a local STR counter that increments by 4/11 every time a new sample is requested. The loop compares this local STR counter with the STR, and adjusts the sample rate converter appropriately.

In one embodiment, this loop works with any reasonable system clock speed. In this embodiment, assume the system clock is 108 MHz for example. When the loop is locked, the sample rate converter should output 74.25/108=11/16 sample every clock. In other words, the SRC will request 11 input sampled every 16 system clocks. When the loop is locked, the rate control signal should represent 11/16.

Figure 6:
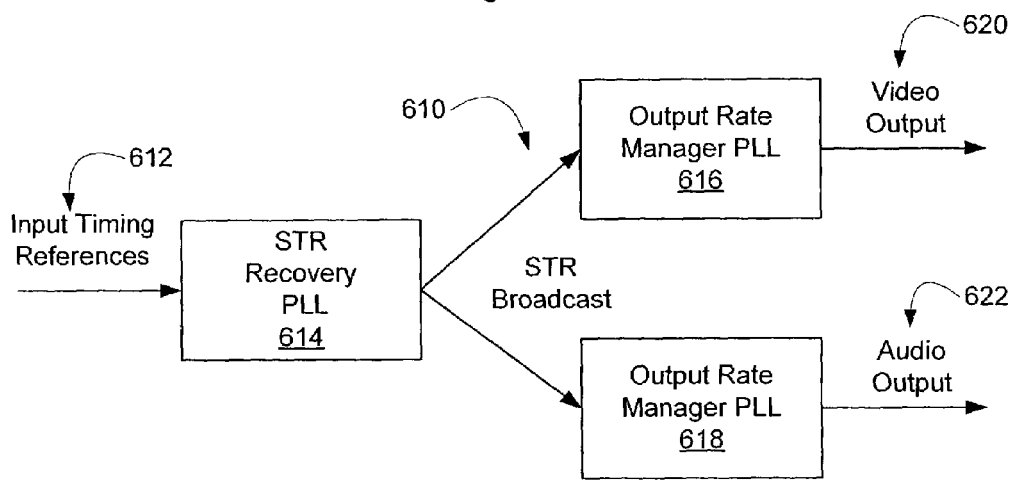
FIG. 6 illustrates a block diagram of one embodiment of a loop that locks the output sample rate to a system time reference comprising a dual PLL in accordance with the present invention.

FIG. 6 illustrates one embodiment of a loop that locks the output sample rate to the system time references generally designated 610. In this embodiment, a digital STR recovery PLL 614 recovers the STR from the input timing references 612. FIG. 6 illustrates the STR recovery PLL 614 communicating with dual PLL's, output rate manager PLLs 616 and 618 (alternatively referred to as second-level PLLs) as an STR broadcast. In one embodiment, the STR recovery PLL 614 removes timing jitter and detects discontinuities In one embodiment, the video and audio output data 620 and 622 respectively are output by one or more SRC's where the output rate is managed by the output rate managers PLLs 616 and 618 and are locked to the STR. In this embodiment, the STR recovery PLL 614 is used to detect timing discontinuities and errors. If the STR recovery PLL 614 detects a discontinuity, it locks to the new time base and notifies the second-level PLLs of the discontinuities. This ensures that both the video and audio outputs 620 and 622 will have similar responses to the discontinuity.

It is contemplated that the audio and video may be output in several different formats. Video may be output as analog data (composite and/or components), digital ITU 656 and/or digital DVI. Audio may be output as analog, digital SPDIF, and/or digital I²S. The first response time of the output PLLs maintain tightly synchronization for the outputs. The STR recovery PLL 614 is used to remove jitter from the time references as previously provided. Because the jitter may be large and the time references relatively infrequent, the STR recovery PLL 614 has a very slow response to changes at the input. The output rate manager PLLs 616 and 618 however receives the jitter-free STR from the STR recovery PLL 614. The output rate manager PLLs 616 and 618 have a faster response time (in comparison to the STR recovery PLL) and quickly track changes. In this manner, the audio and video outputs 620 and 622 quickly and closely track the STR from the STR recovery PLL 614. It is contemplated that the video and audio outputs are tightly synchronized.

If each output PLL 616 and 618 is locked directly to the input timing reference 612, each output PLL would have a slow response time. The audio and video outputs 622 and 620 would not be tightly synchronized, and there might be large timing differences between different outputs.

It is contemplated that the STR recovery PLL 614 is a convenient place to add CPU control of the A/V decoder. The CPU (not shown) may be used to adjust the STR recovery PLL 614, such that all outputs would automatically (and synchronously) track the changes. Changes to the STR may be useful for personal video recorder (alternatively referred to as "PVR") operation or for STR-based trick modes like pause and fast forward.

Figure 7:
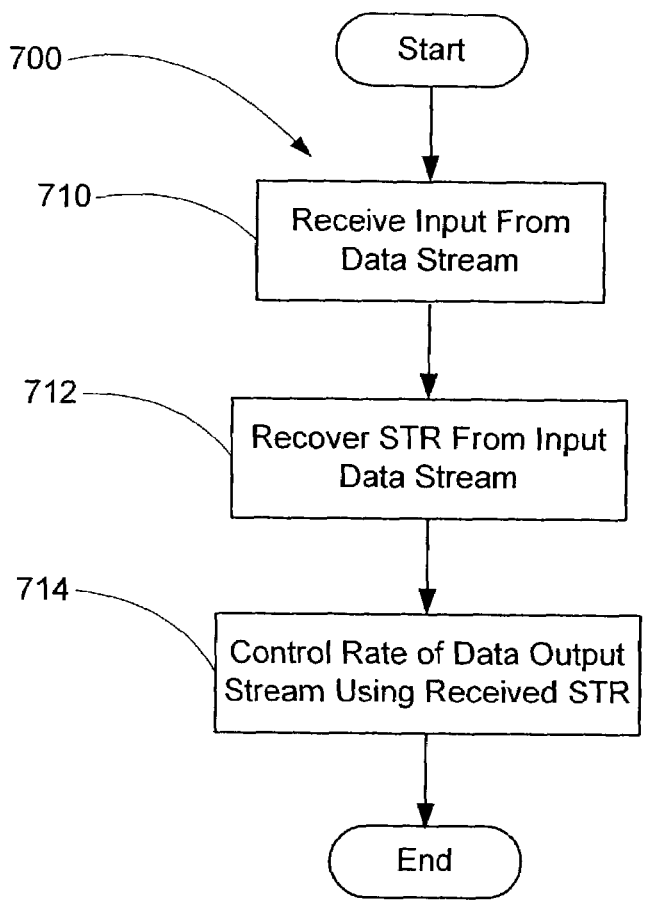
FIG. 7 illustrates one embodiment of a flow diagram for a method of controlling a rate of data output in accordance with one embodiment of the present invention.

FIG. 7 illustrates an embodiment of a high-level flow diagram for a timing path in accordance with one embodiment of the present invention. More specifically, FIG. 7 illustrates a flow diagram for controlling the rate of a data output stream using a recovered STR in an A/V decoder in accordance with one embodiment of the present invention.

In this embodiment, the method, generally designated 700, receives input from a data stream, forming one or more received input data streams as illustrated by block 710. It is contemplated that the input data streams may be received by a receiver and stored in a buffer, an input buffer for example. The system time reference or STR is recovered from the input data stream as illustrated by block 712 using an STR recovery device for example similar to that provided previously. The rate of the data output stream is controlled using the recovered STR as illustrated by block 714.

Figure 8:
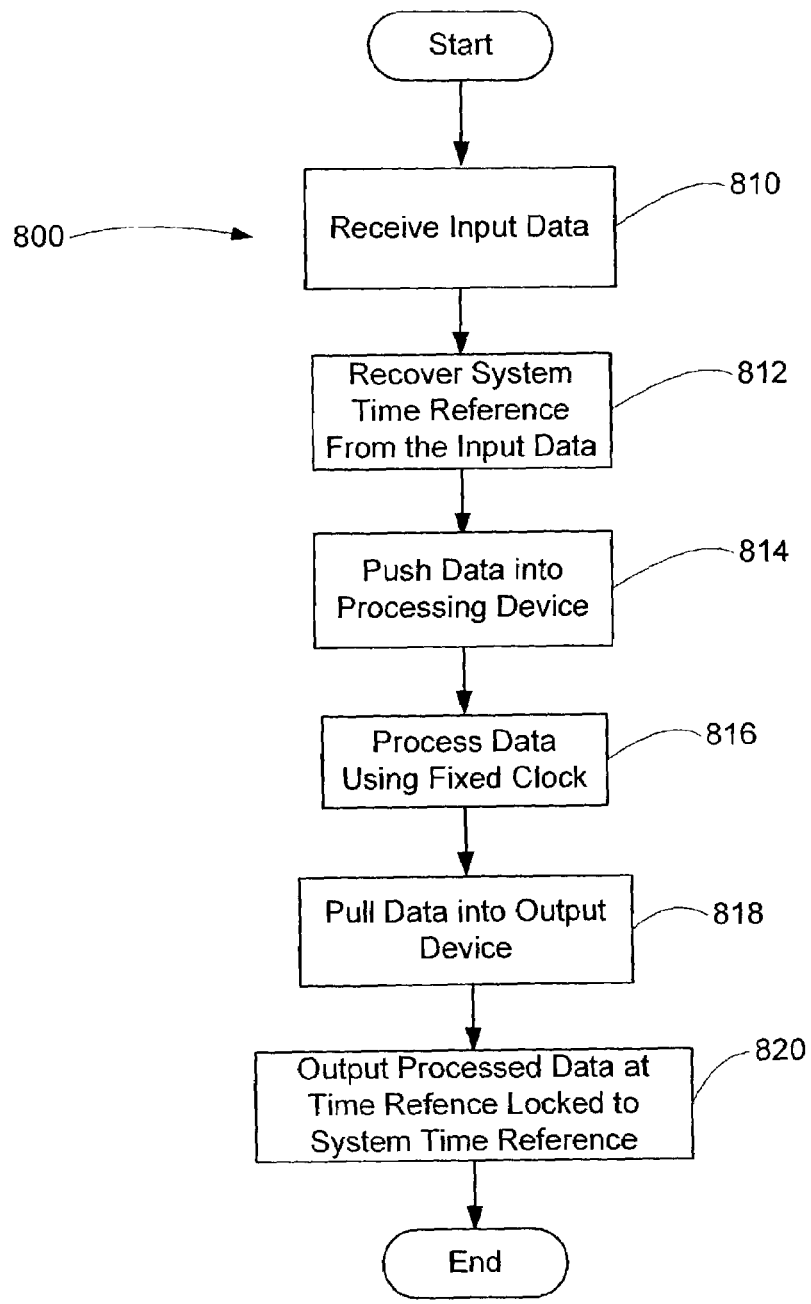
FIG. 8 illustrates one embodiment of a flow diagram for a method of processing data in accordance with one embodiment of the present invention.

FIG. 8 illustrates one embodiment of a flow diagram 800 for processing data in data stream. More specifically, one embodiment of the present invention relates to a method of processing data using a clock that is asynchronous to a system time reference. In the illustrated embodiment of the present invention, the data is received, in one embodiment using a receiver, as illustrated by block 810. A system time reference is recovered from the received data as illustrated by block 812. In one embodiment, the system time reference is recovered from the data using a STR recovery device as provided previously.

The data is pushed into one or more processing devices as illustrated by block 814. The data is processed as illustrated by block 816 using a fixed clock. In one embodiment, the data is processed (decoded, captured, played back, graphics produced, etc.) using a fixed clock that is asynchronous to the system time reference. The processed data is then pulled into an output device as illustrated by block 818. The processed data is output at a time reference that is locked to the system time reference as illustrated by block 820.

Figure 9:
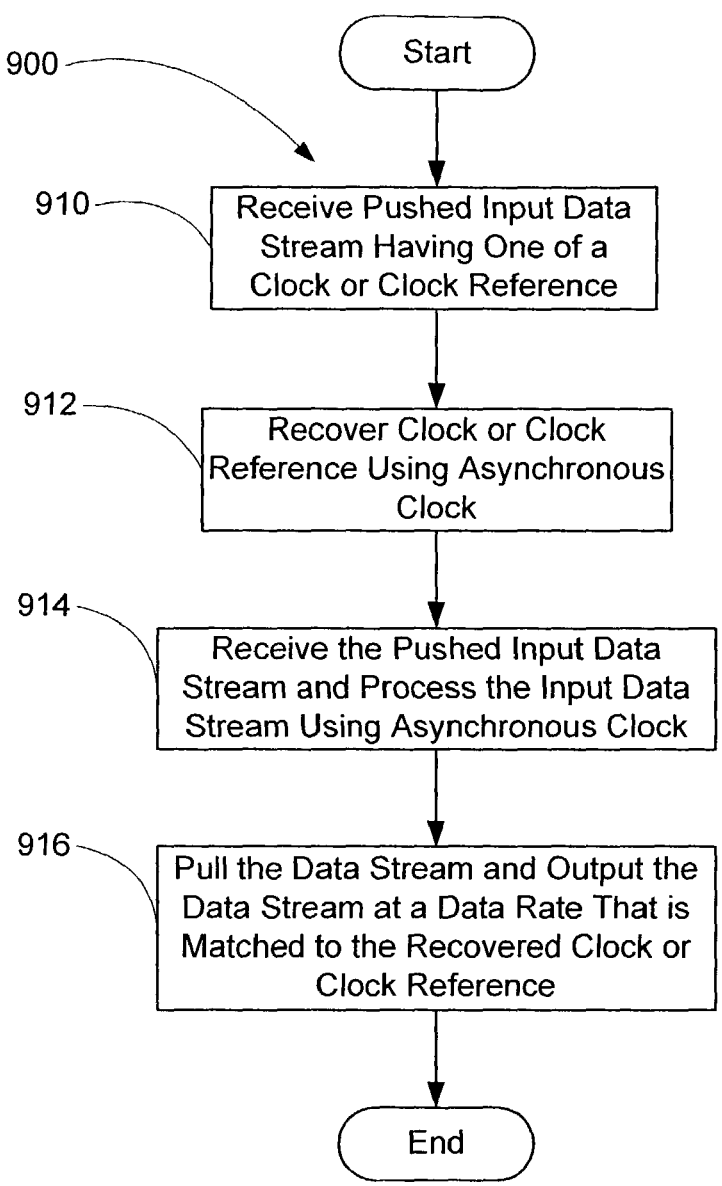
FIG. 9 illustrates one embodiment of a flow diagram for pulling a data stream in accordance with one embodiment of the present invention.

FIG. 9 illustrates one embodiment of a flow diagram for pulling the data stream at a data rata that is locked to a recovered clock or clock reference using an A/V decoder in accordance with the present invention. In accordance with the present invention, the method, generally designated 900, comprises receiving one or more pushed input data streams having one of a clock or a clock references as illustrated by block 910. In this embodiment, the clock or clock reference is recovered using an asynchronous clock or clock reference as illustrated by block 912.

Method 900 further comprises receiving the pushed input data stream and processes it using one of the asynchronous clock or clock references as illustrated by block 914. Finally, method 900 comprises pulling the data stream and outputting the data stream at a rate that is matched to the recovered clock or clock reference as illustrated by block 916.

Many modifications and variations of the present invention are possible in light of the above teachings. Thus, it is to be understood that, within the scope of the appended claims, the invention may be practiced otherwise than as described hereinabove.

This invention claimed is:

1. A method of decoding data using an A/V decoder comprising:
   recovering timing information from an input stream; and
   adjusting an output rate of an output stream using said recovered timing information, said output stream having a clock that is asynchronous to a time reference of said input stream, wherein adjusting an output rate of the output stream further comprises pulling data into an output device.

2. The method of claim 1, wherein the adjusting said output rate of said output stream comprises matching said output rate to said timing reference.

3. The method of claim 1, further comprising receiving said input stream.

4. The method of claim 1, wherein said input and output streams are input and output data streams.

5. A method of decoding data using an AV decoder comprising;
   receiving an input stream at an input rate:
   recovering a system time reference from said input stream;
   matching an output rate of an output stream to said system time reference, wherein matching the output rate further comprises requesting data into an output device, by said output device; and
   outputting said output stream having a clock rate asynchronous to said system time reference at said output rate.

6. A method of processing data using an A/V decoder comprising:
   recovering a system time reference from the data;
   processing the data using a clock asynchronous to said system time reference;
   pulling the data into an output device; and
   outputting the data having a time reference locked to said system timing reference.

7. The method of claim 6, further comprising receiving the data prior to recovering said system time reference.

8. The method of claim 6, further comprising receiving said data at a first rate.

9. The method of claim 8, further comprising outputting said data at a second rate.

10. The method of claim 9, wherein said second rate matches said first rate.

11. The method of claim 6, further comprising pushing the data into a processing device prior to processing the data.

12. The method of claim 6, wherein the processing said data comprises decoding, capturing, playing back, and producing graphics from the data.

13. A method of processing data using an A/V decoder comprising:
   receiving the data;
   recovering a system time reference from the data using at least one system time reference recovery device;
   processing the data in at least one processing device using a clock asynchronous to said system timing reference;
   pulling the data into an output device, wherein the at least one processing device and output device handshake with each other; and
   outputting the data having a time reference locked to said system timing reference.

14. A method of decoding data in a data stream using an A/V decoder, comprising:
   receiving the data from the data stream;
   recovering a system time reference from the data using at least one system time reference recovery device;
   pushing the data into at least one processing device adapted to process the data using a clock asynchronous to said system time reference;
   pulling the data from the at least one processing device into an output device, wherein the at least one processing device and the output device use at least one digital data protocol;
   outputting the data.

15. An A/V decoder adapted to decode data in one or more data streams, comprising:
   a recovery device adapted to recovering a system time reference from the data;
   at least one data processing device adapted to process the data using a clock asynchronous to said system timing reference; and
   an output device adapted to pull the data from the processing device and output the data having a time reference locked to said system timing reference.

16. The A/V decoder of claim 15 comprising wherein said recovery device comprises an NCO recovery device adapted to recover said system time reference.

17. The A/V decoder of claim 15, wherein said output device comprises at least a sample rate conversion device adapted to control an output rate of said data.

18. The A/V decoder of claim 15, wherein said output device comprises at least a phase locked loop adapted to lock said time reference to said system timing reference.

19. The A/V decoder of claim 15, comprising a data protocol adapted to control a rate of said processing of said data.

* * * * *